US008952654B2

(12) United States Patent
Uramoto et al.

(10) Patent No.: US 8,952,654 B2
(45) Date of Patent: Feb. 10, 2015

(54) FEED SYSTEM, FEED APPARATUS, AND ELECTRONIC DEVICE

(75) Inventors: Yoichi Uramoto, Kanagawa (JP); Masayuki Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 592 days.

(21) Appl. No.: 13/183,644

(22) Filed: Jul. 15, 2011

(65) Prior Publication Data

US 2012/0025760 A1    Feb. 2, 2012

(30) Foreign Application Priority Data

Jul. 29, 2010  (JP) ................................. 2010-170059

(51) Int. Cl.
*H02J 7/00*    (2006.01)
*H02J 7/02*    (2006.01)

(52) U.S. Cl.
CPC .............. *H02J 7/025* (2013.01); *H02J 7/0027* (2013.01)
USPC ............................ 320/108; 320/109; 320/139

(58) Field of Classification Search
USPC .............. 320/108, 109, 115, 139; 455/69, 89, 455/411, 437; 379/61, 62, 443; 361/82
See application file for complete search history.

(56) References Cited

U.S. PATENT DOCUMENTS

| 5,991,170 | A | * | 11/1999 | Nagai et al. ..................... 363/20 |
| 6,024,308 | A | | 2/2000 | Bartels et al. |
| 7,109,682 | B2 | * | 9/2006 | Takagi et al. ................. 320/108 |
| 2004/0145342 | A1 | | 7/2004 | Lyon |
| 2007/0279002 | A1 | * | 12/2007 | Partovi ........................... 320/115 |
| 2008/0164839 | A1 | * | 7/2008 | Kato et al. ..................... 320/108 |
| 2010/0060300 | A1 | * | 3/2010 | Muller et al. ................. 324/686 |
| 2010/0084918 | A1 | * | 4/2010 | Fells et al. ........................ 307/32 |

FOREIGN PATENT DOCUMENTS

| CN | 1604437 | 4/2005 |
| JP | 2001-102974 | 4/2001 |
| JP | 2001-211558 | 8/2001 |
| JP | 2002-034169 | 1/2002 |
| JP | 2005-110399 | 4/2005 |
| JP | 2005-525705 | 8/2005 |
| JP | 2007-089341 | 4/2007 |
| JP | 2008-206233 | 9/2008 |
| JP | 2009-247124 | 10/2009 |
| JP | 2009-296705 | 12/2009 |
| JP | 2010-022105 | 1/2010 |
| JP | 2010-141966 | 6/2010 |

(Continued)

OTHER PUBLICATIONS

Japanese Office Action issued in connection with related Japanese Patent Application No. 2010-170059 dated Feb. 4, 2014.

(Continued)

*Primary Examiner* — Yalkew Fantu
(74) *Attorney, Agent, or Firm* — Dentons US LLP

(57) ABSTRACT

A feed system includes a plurality of electronic devices; and a feed apparatus having a power transmission section performing electric power transmission using a magnetic field to the plurality of electronic devices. Each of the electronic devices includes a power receiving section receiving electric power transmitted from the power transmission section, and a switching section switching whether or not to carry out charging operation based on the electric power received by the power receiving section, according to time sharing control by a system control section.

5 Claims, 13 Drawing Sheets

(56) References Cited

FOREIGN PATENT DOCUMENTS

| | | |
|---|---|---|
| JP | 2010-116441 | 10/2010 |
| JP | 2011-205788 | 10/2011 |
| WO | 00/27531 | 5/2000 |

OTHER PUBLICATIONS

Chinese Office Examination issued in connection with related Chinese Patent Application No. CN 201110206785.4 dated Jun. 4, 2014.

* cited by examiner

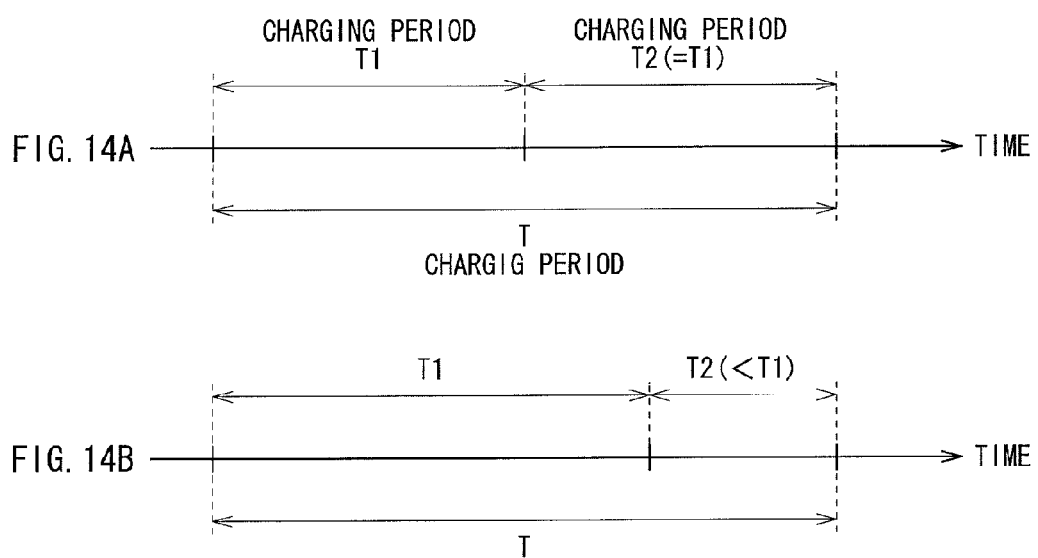

FEED SYSTEM, FEED APPARATUS, AND ELECTRONIC DEVICE

BACKGROUND

The present disclosure relates to a feed system performing noncontact power supply (electric power transmission) to, for example, an electronic device such as a portable telephone, and also relates a feed apparatus and an electronic device applied to such a feed system.

In recent years, attention has been given to a feed apparatus (noncontact charger, or wireless charger) that performs noncontact power supply using electromagnetic induction, magnetic resonance, or the like to a CE device (Consumer Electronics Device) such as a portable telephone or a portable music player (for example, Japanese Unexamined Patent Application Publications No. 2001-102974, No. 2008-206233, No. 2002-34169, No. 2005-110399, and International Publication No. WO00/27531). This makes it possible to start the charge merely by placing an electronic device on a tray (charging tray) for charging the electronic device, instead of starting the charge by inserting (connecting) a connector of a power-supply unit such as an AC adapter into the device. In other words, terminal connection between the electronic device and the charging tray may be eliminated.

SUMMARY

Incidentally, in view of user convenience, conceivably, it will be desirable to be able to perform the noncontact power supply as described above for two or more electronic devices by using a single charging tray (a feed apparatus). However, it is conceivable that when such noncontact power supply be performed simultaneously for two or more electronic devices (in a case of "1:N (two or more)" charge), the following disadvantage may occur.

First, when an attempt is made to perform efficient power supply (charge) for two or more electronic devices simultaneously placed on a charging tray, the circuit configuration of a circuit such as an impedance matching circuit provided in the charging tray or the electronic device becomes complicated. Specifically, in a case of noncontact power supply using magnetic resonance in particular, use of a pinpoint impedance matching circuit is desired in order to increase electric-power transmission efficiency. However, there is a large difference in control range between a case of "1:1" charge and a case of "1:N" charge. Further, generally, the impedance of each electronic device changes depending on a state of charging a battery built therein. Therefore, in the case of "1:N" charge, the electronic devices usually vary in the state of charging. Thus, in the case of "1:N" charge, when an attempt is made to perform appropriate impedance matching for all the electronic devices, difficult control is desired.

In addition, in the "1:N" charge, electric power from the charging tray side is basically divided into N and supplied to the respective electronic devices. In this case however, the electronic devices have some little influence on each other due to mutual induction and the like and thus, mutually disturb receipt of the electric power, leading to such a disadvantage that electric-power transmission efficiency decreases.

For the situation described above, there is demand for suggestion of a technique that makes it possible to supply the electric power efficiently by a simple structure, when the electric power transmission using the magnetic field to the electronic devices is performed.

In view of the foregoing, it is desirable to provide a feed system, a feed apparatus, and an electronic device, which allow efficient supply of electric power by a simple structure, when electric power transmission using a magnetic field to two or more electronic devices is performed.

According to an embodiment of the present disclosure, there is provided a feed system that includes electronic devices, and a feed apparatus having a power transmission section performing electric power transmission using a magnetic field to the electronic devices. Each of the electronic devices includes: a power receiving section receiving electric power transmitted from the power transmission section; and a switching section switching whether or not to carry out charging operation based on the electric power received by the power receiving section, according to time sharing control by a system control section.

According to another embodiment of the present disclosure, there is provided a feed apparatus including: a power transmission section performing electric power transmission using a magnetic field to electronic devices; and a system control section performing time sharing control to switch whether or not to carry out charging operation in each of the electronic devices based on electric power transmitted by the power transmission section.

According to another embodiment of the present disclosure, there is provided an electronic device including: a power receiving section receiving electric power transmitted from a feed apparatus performing electric power transmission using a magnetic field; and a switching section switching whether or not to carry out charging operation based on the electric power received by the power receiving section, according to time sharing control by a system control section.

In the feed system, the feed apparatus, and the electronic device according to the above-described embodiments of the present disclosure, when the electric power transmission using the magnetic field to the electronic device is performed, the time sharing control to switch whether or not to carry out the charging operation based on the electric power transmitted from the power transmission section (the feed apparatus) to the power receiving section (the electronic device) is performed. This realizes effective electric power transmission to the electronic device, without using a complicated circuit (for example, an impedance matching circuit and the like). In addition, due to the time sharing control, mutual induction or the like between the electronic devices is avoided, and efficiency at the time of the electric power transmission improves in this respect as well.

According to the feed system, the feed apparatus, and the electronic device in the above-described embodiments of the present disclosure, the time sharing control to switch whether or not to carry out the charging operation based on the electric power transmitted from the power transmission section (the feed apparatus) to the power receiving section (the electronic device) is performed. Therefore, it is possible to avoid using a complicated circuit and causing mutual induction or the like, thereby realizing efficient electric power transmission to the electronic device. Accordingly, when the electric power transmission using the magnetic field to the electronic devices is performed, the electric power may be supplied efficiently in a simple structure.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Figure 6:
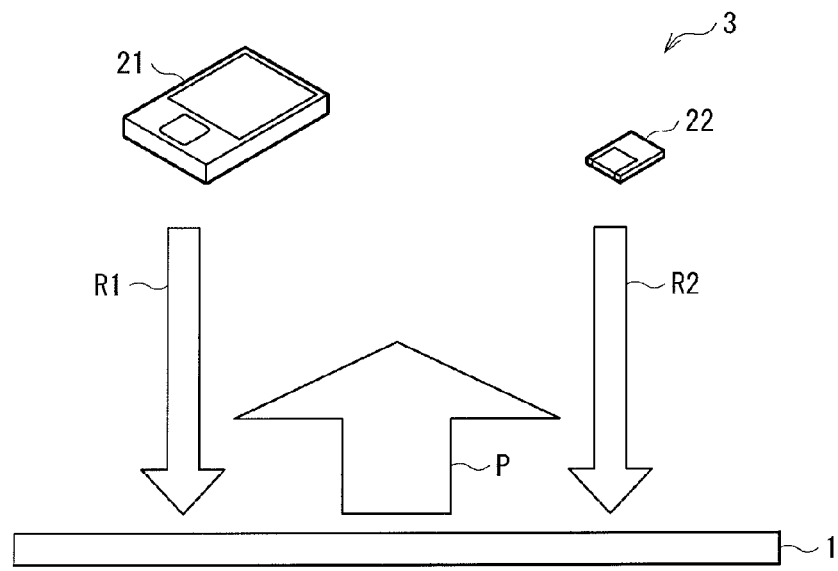
FIG. 6 is a schematic diagram for explaining a summary of Polling processing illustrated in FIG. 5.
Figure 7:
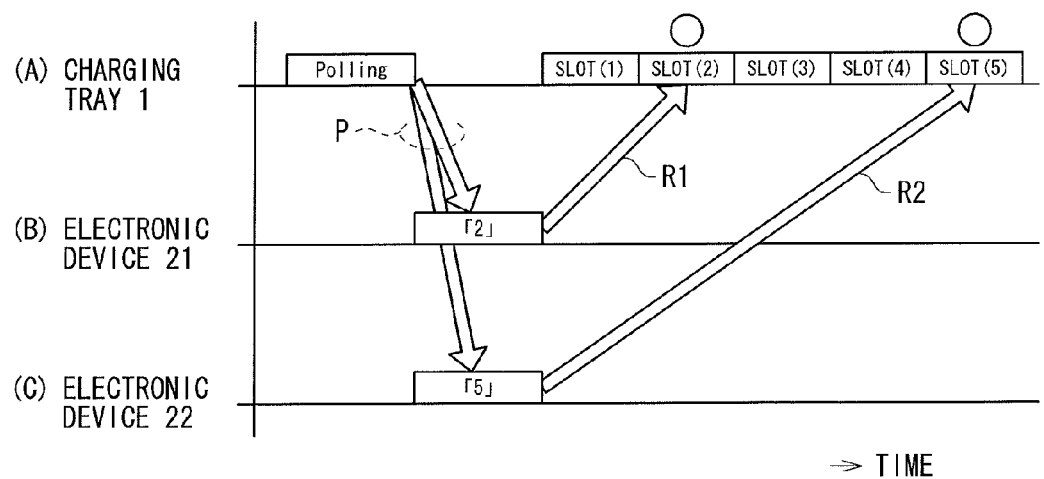

Parts (A) to (C) of FIG. 7 are timing charts illustrating an example (a successful example) of an anti-collision measure using the Polling processing illustrated in FIG. 6.

Figure 8:
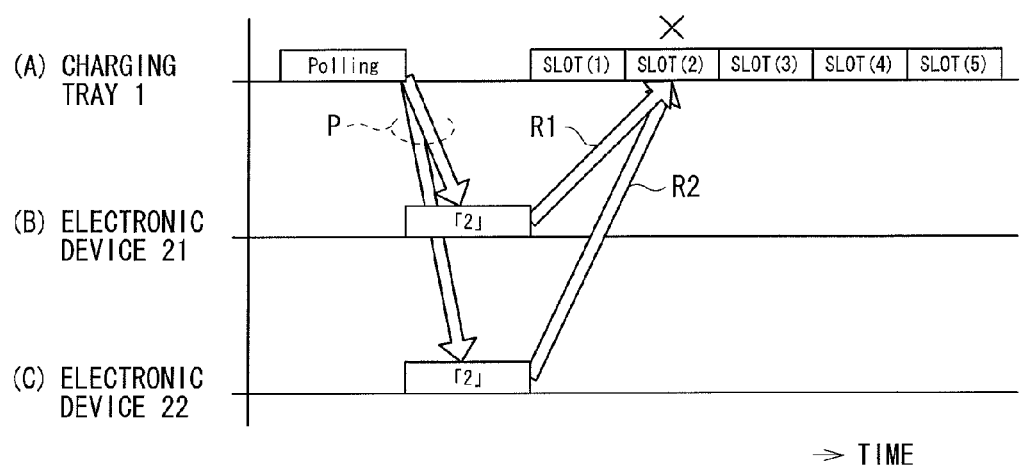

Parts (A) to (C) of FIG. 8 are timing charts illustrating an example (an unsuccessful example) of the anti-collision measure using the Polling processing illustrated in FIG. 6.

Figure 9:
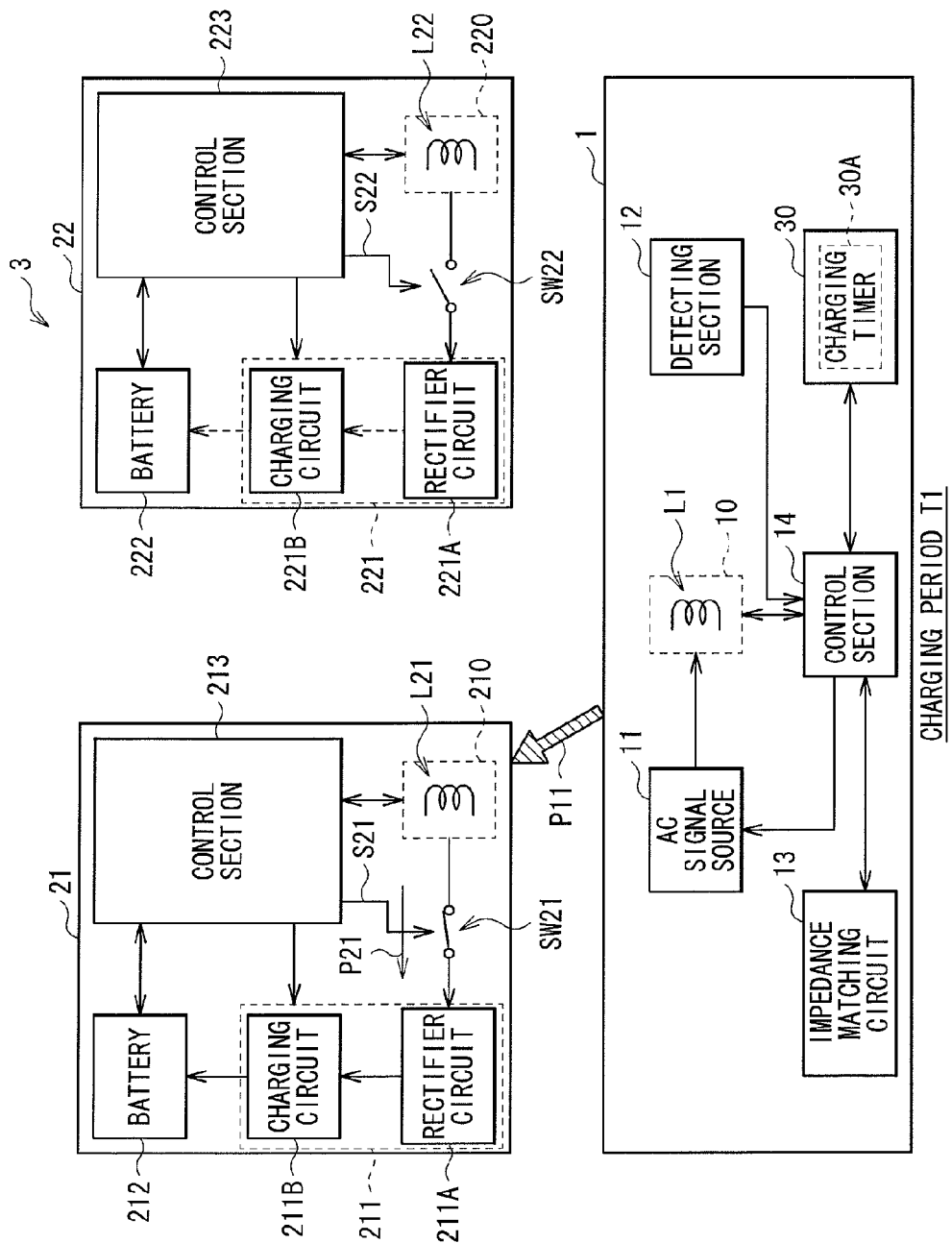

FIG. 9 is a block diagram illustrating an example of the charging operation according to the embodiment.

Figure 10:
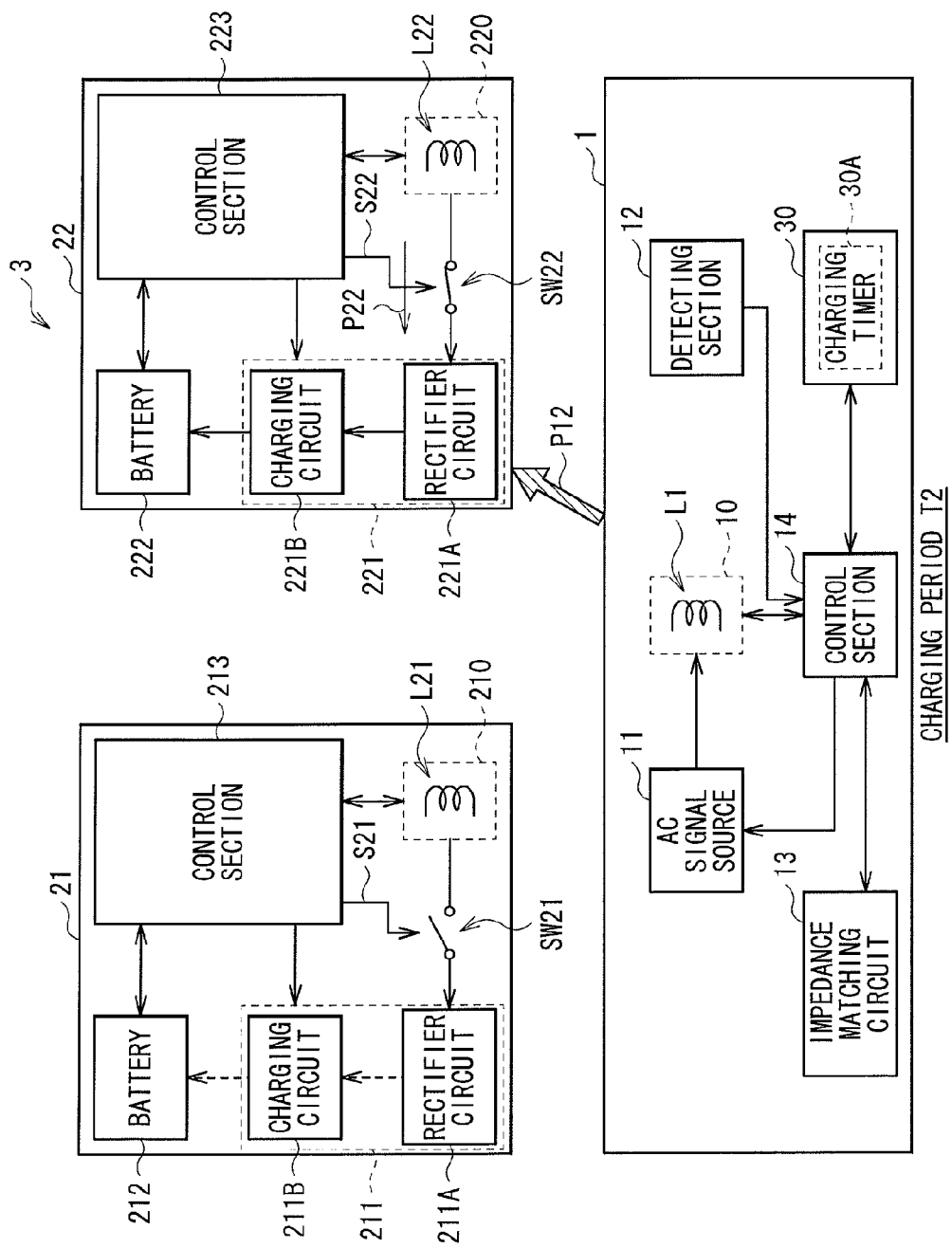

FIG. 10 is a block diagram illustrating another example of the charging operation according to the embodiment.

Figure 11:
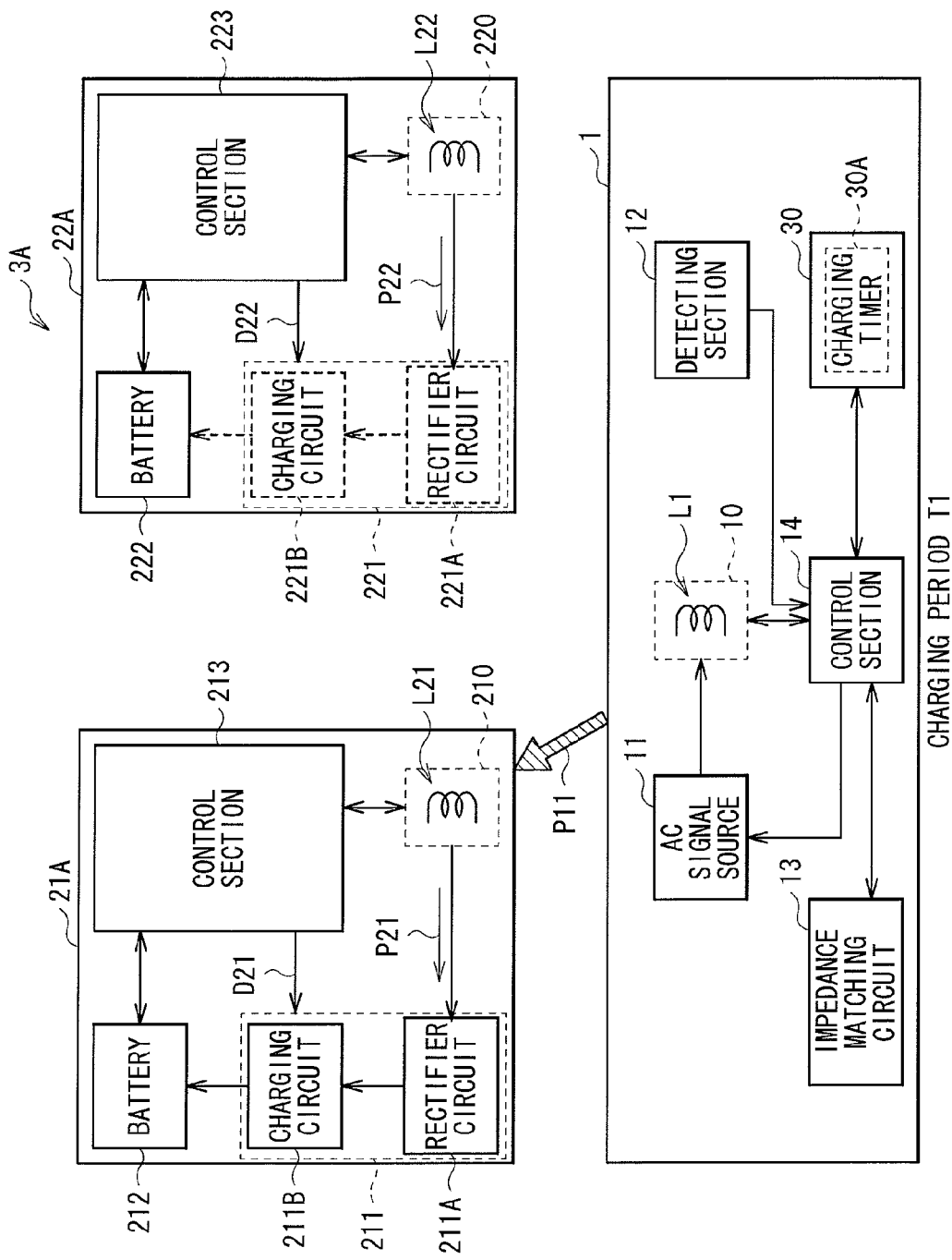

FIG. 11 is a block diagram illustrating an example of charging operation in a feed system according to a modification 1.

Figure 12:
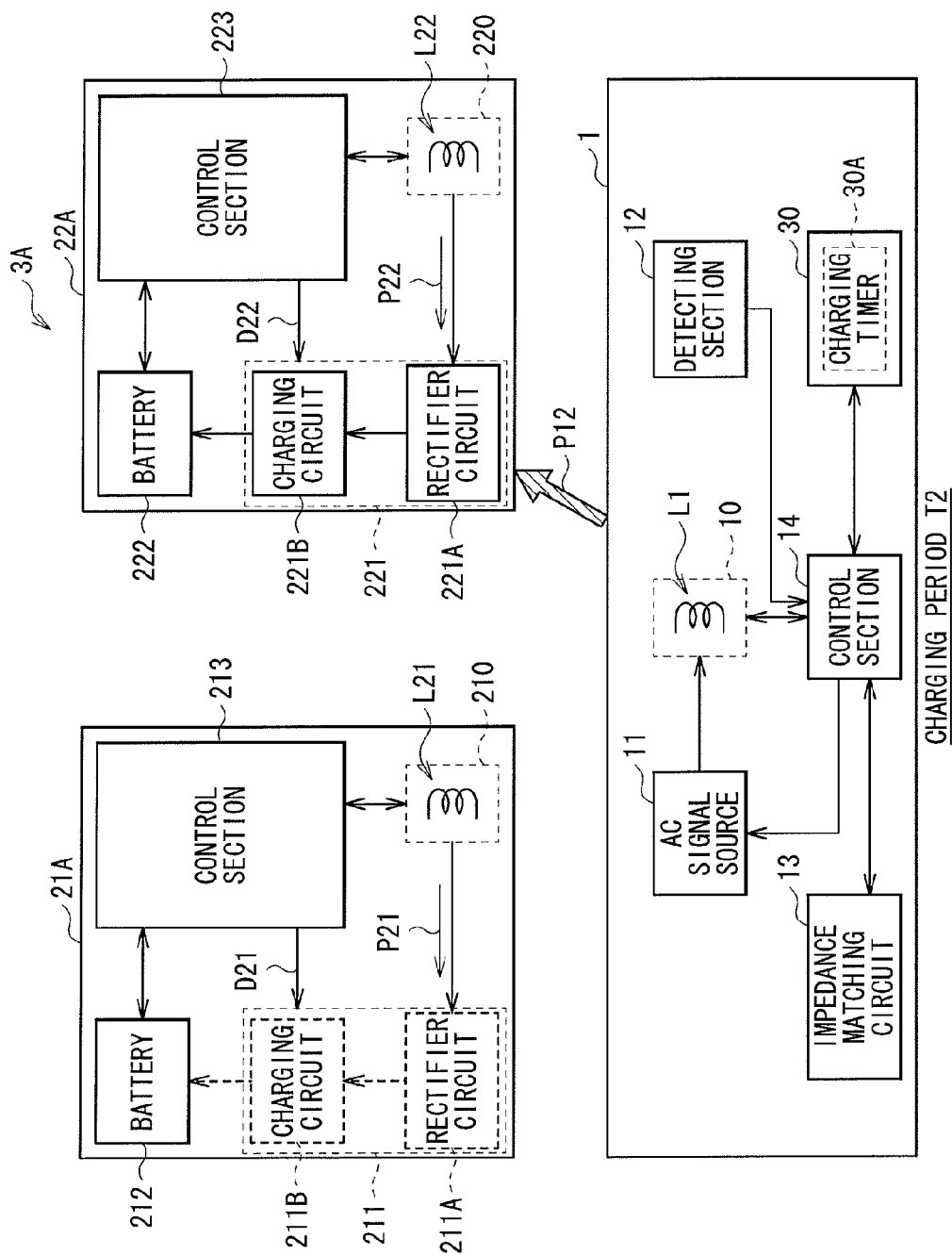

FIG. 12 is a block diagram illustrating another example of the charging operation in the feed system according to the modification 1.

Figure 13:
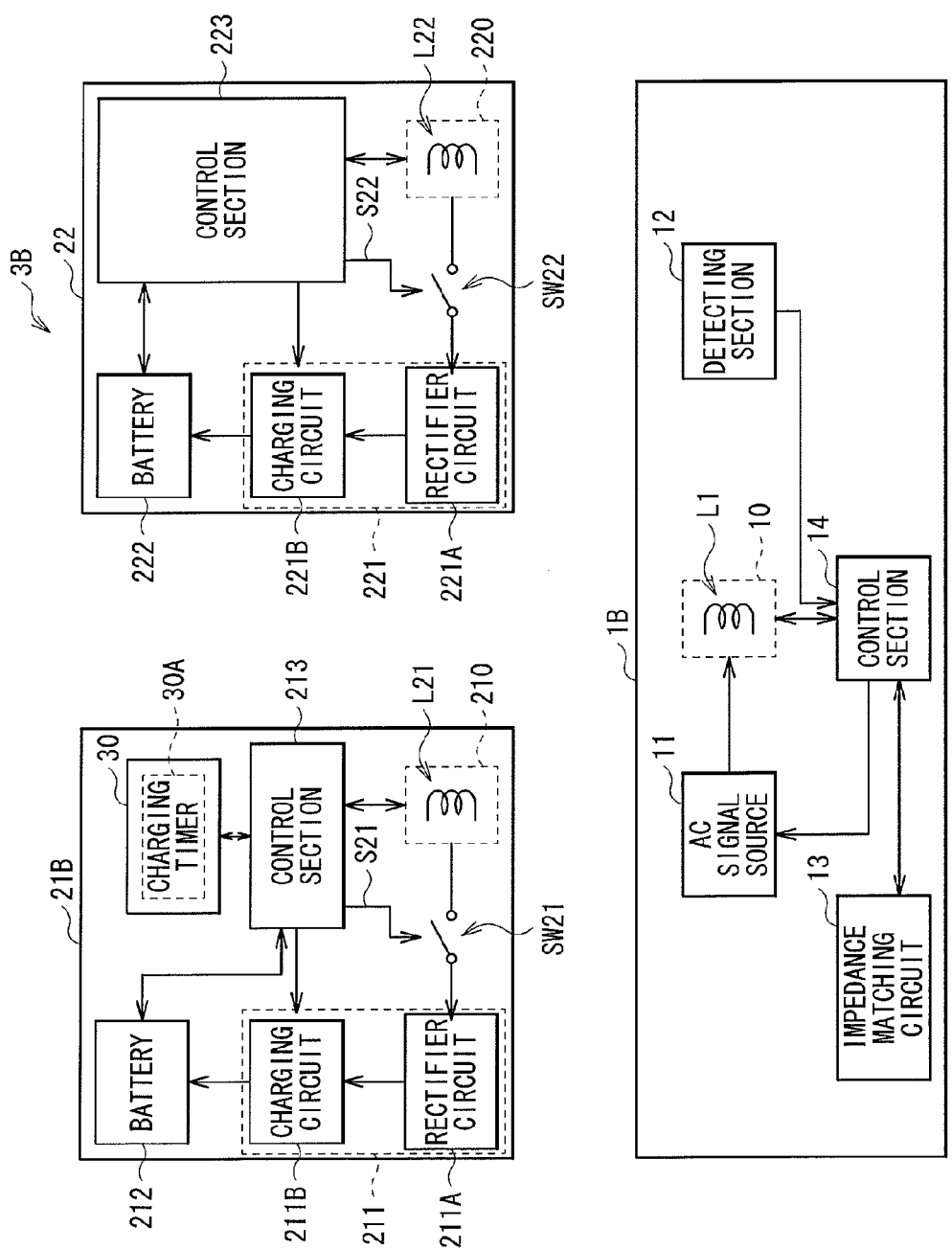

FIG. 13 is a block diagram illustrating an example of an overall configuration of a feed system according to a modification 2.

FIGS. 14A and 14B are timing charts each illustrating an example of charging operation according to a modification 3.

DETAILED DESCRIPTION OF EMBODIMENTS

An embodiment of the present disclosure will be described below in detail with reference to the drawings. Incidentally, the description will be provided in the following order.
1. Embodiment (an example of charging operation by time sharing using a switch on a path to a charging section)
2. Modifications
   Modification 1 (an example of charging operation by time sharing using a disable signal to a charging section)
   Modification 2 (an example in which a system control section is provided in one of electronic devices)
   Modification 3 (an example of performing charging operation for electronic devices according to priority)

Embodiment

Configuration of Feed System 3

Figure 1:
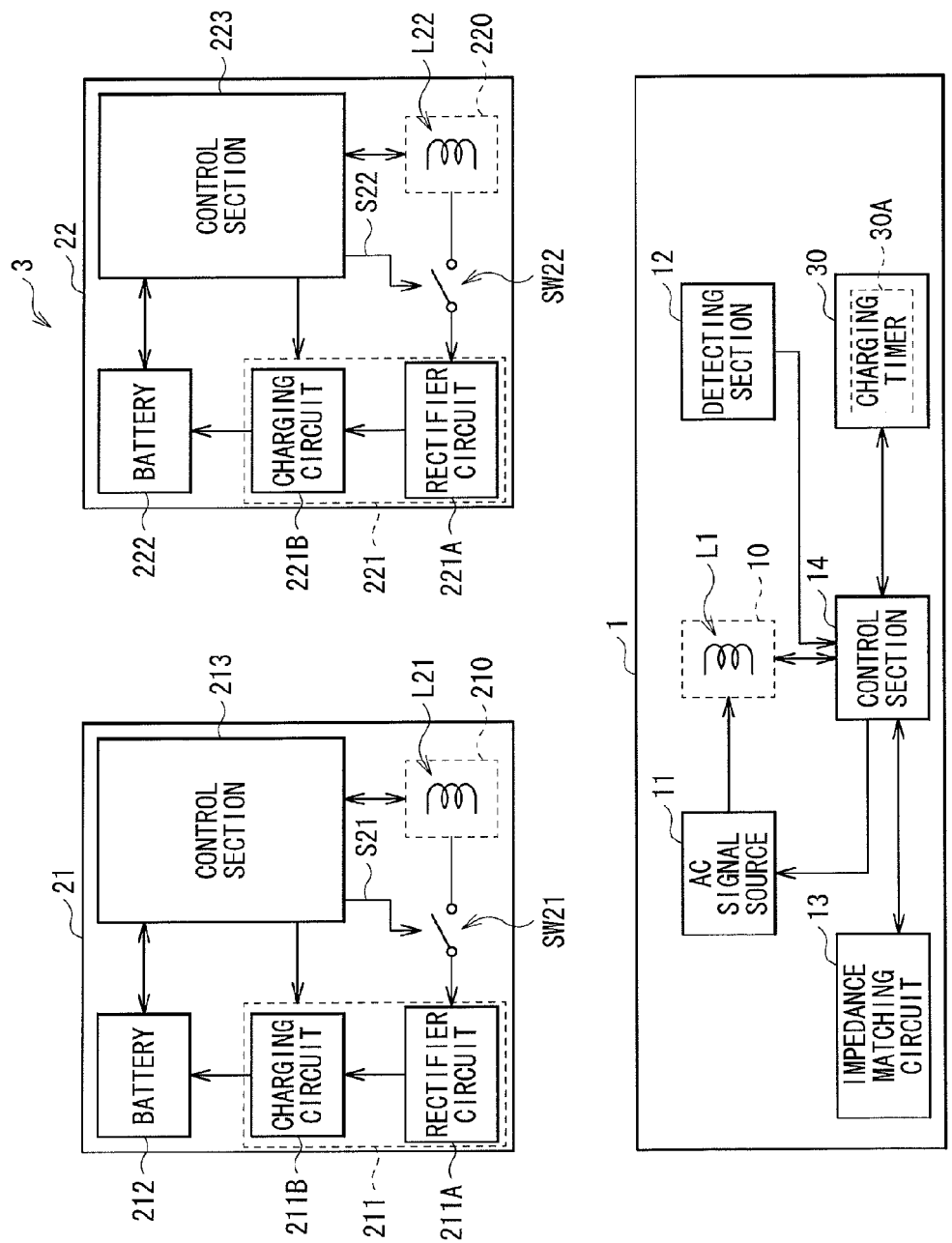
FIG. 1 is a block diagram illustrating an example of an overall configuration of a feed system according to an embodiment of the present disclosure.

FIG. 1 illustrates an overall block configuration of a feed system (feed system 3) according to an embodiment of the present disclosure. This feed system 3 performs noncontact electric power transmission (power supply, feeding) by using a magnetic field (using electromagnetic induction, magnetic resonance, or the like, which also applies to the description hereinafter), and has a charging tray (feed apparatus) 1 (primary device), and two or more (here, two) electronic devices 21 and 22 (secondary device). In other words, in the feed system 3, electric power transmission from the charging tray 1 to the electronic devices 21 and 22 is performed, when the electronic devices 21 and 22 are placed on (or brought near) the charging tray 1. That is, this feed system 3 is a noncontact feed system.

[Charging Tray 1]

The charging tray 1 is a feed apparatus that performs electric power transmission to the electronic devices 21 and 22 by using the magnetic field as mentioned above. This charging tray 1 has a power transmission section 10, an AC signal source 11, a detecting section 12, an impedance matching circuit 13, a control section 14, and a system control section 30.

The power transmission section 10 is configured to include a coil (primary coil) L1. Through use of this coil L1, the power transmission section 10 performs electric power transmission using the magnetic field to the electronic devices 21 and 22 (specifically, power receiving sections 210 and 220 to be described later). Specifically, the power transmission section 10 has a function to emit the magnetic field (magnetic flux) to the electronic devices 21 and 22. It is to be noted that although details will be described later, this power transmission section 10 also performs transmission and reception of predetermined signals to and from the electronic devices 21 and 22.

The AC signal source 11 is configured to include, for example, an AC power source, an oscillator, an amplifier circuit, and the like, and is a signal source that supplies a predetermined AC signal for performing electric power transmission to the coil L1 in the power transmission section 10.

The detecting section 12 detects, for example, metallic foreign matter on the charging tray 1, or detects a temperature (environmental temperature), a pressure (environmental pressure), or the like around the charging tray 1. This makes it possible to avoid an excessive rise in the temperature of the metallic foreign matter or the like, and perform the electric power transmission according to the environmental temperature or the environmental pressure.

The impedance matching circuit 13 is a circuit that carries out impedance matching when the electric power transmission from the charging tray 1 to the electronic devices 21 and 22 is performed. Specifically, here, the impedance (for example, the impedance of the coil L1) in the power transmission section 10 is changed according to the magnitude of the impedance (for example, the impedances of coils L21 and L22 to be described later, in the power receiving sections 210 and 220, respectively) in each of the electronic devices 21 and 22. This improves the efficiency in the electric power transmission (electric-power transmission efficiency). Incidentally, this impedance matching will be described later more in detail.

The control section 14 controls the entire operation of the charging tray 1, and is configured by using, for example, a microcomputer and the like. Specifically, the control section 14 is configured to control the operation of the power transmission section 10 and the AC signal source 11, according to a detection result in the detecting section 12 or a matching result in the impedance matching circuit 13.

The system control section 30 controls the entire operation of the feed system 3, and also is configured by, for example, a microcomputer and the like. This system control section 30 has a charging timer 30A for measuring the length of charging time in each of the electronic devices 21 and 22. Although details will be described later, the system control section 30 performs time sharing control for switching whether or not to carry out the charging operation based on the electric power transmitted by the power transmission section 10, in each of the electronic devices 21 and 22.

[Electronic Devices 21 and 22]

The electronic device 21 has the power receiving section 210, a charging section 211, a battery 212, a control section 213, and a switch SW21. Similarly, the electronic device 22 has the power receiving section 220, a charging section 221, a battery 222, a control section 223, and a switch SW22. Of these, each of the control sections 213 and 223 is equivalent to a specific example of "the switching section" according to the earlier-described embodiments of the present disclosure.

The power receiving section 210 is configured to include a coil (secondary coil) L21. The power receiving section 210 has a function to receive electric power transmitted from the power transmission section 10 in the charging tray 1, through the use of this coil L21. Similar, the power receiving section 220 is configured to include a coil (secondary coil) L22. The power receiving section 220 has a function to receive electric power transmitted from the power transmission section 10 in the charging tray 1, through the use of this coil L22. It is to be noted that although details will be described later, these power receiving sections 210 and 220 each perform transmission and reception of a predetermined signal to and from the charging tray 1.

The charging section 211 is configured to include a rectifier circuit 211A and a charging circuit 211B, and performs charging operation for the battery 212 based on the electric power (AC power) received by the power receiving section 210. Specifically, the rectifier circuit 211A is a circuit that rectifies the AC power supplied from the power receiving section 210 via the switch SW21 to be described below, and generates DC power. The charging circuit 211B is a circuit for charging the battery 212 based on the DC power supplied from the rectifier circuit 211A.

Similarly, the charging section 221 is configured to include a rectifier circuit 221A and a charging circuit 221B, and performs charging operation for the battery 222 based on the electric power (AC power) received by the power receiving section 220. Specifically, the rectifier circuit 221A is a circuit that rectifies the AC power supplied from the power receiving section 220 via the switch SW22 to be described below, and generates DC power. The charging circuit 221B is a circuit for charging the battery 222 based on the DC power supplied from the rectifier circuit 221A.

The switch SW21 is provided on a path between the power receiving section 210 and the rectifier circuit 211A in the charging section 211. Similarly, the switch SW22 is provided on a path between the power receiving section 220 and the rectifier circuit 221A in the charging section 221. Each of these switches SW21 and SW22 is configured, for example, using an electrical switch employing a semiconductor element, a mechanical switch, or the like.

The batteries 212 and 222 store electric power according to the charge by the charging circuit 211B and the charging circuit 221B, respectively, and are each configured, for example, using a secondary battery such as a lithium ion battery.

The control section 213 controls the entire operation of the electronic device 21, and is configured, for example, using a microcomputer or the like. Specifically, the control section 213 controls the operation of the power receiving section 210, the charging section 211, and the battery 212. Further, this control section 213 has a function of switching whether or not to carry out the charging operation (charging operation by the charging section 211) based on the electric power received by the power receiving section 210, according to the time sharing control by the system control section 30 described above. Specifically, although details will be described later, the control section 213 is configured to switch whether or not to carry out the charging operation described above, by controlling on-off operation of the switch SW21 through use of a switch control signal S21, according to the time sharing control by the system control section 30.

Similarly, the control section 223 controls the entire operation of the electronic device 22, and is configured, for example, using a microcomputer or the like. Specifically, the control section 223 controls the operation of the power receiving section 220, the charging section 221, and the battery 222. Further, this control section 223 has a function of switching whether or not to carry out the charging operation (charging operation by the charging section 221) based on the electric power received by the power receiving section 220, according to the time sharing control by the system control section 30 described above. Specifically, although details will be described later, the control section 223 is configured to switch whether or not to carry out the charging operation described above, by controlling on-off operation of the switch SW22 through use of a switch control signal S22, according to the time sharing control by the system control section 30.

[Operation and Effect of Feed System 3]

[1. Summary of Charging Operation]

In the feed system 3 of the present embodiment, in the charging tray 1, the AC signal source 11 supplies, according to the control by the control section 14, the coil L1 in the power transmission section 10 with a predetermined AC signal for performing the electric power transmission. As a result, a magnetic field (magnetic flux) is produced in the coil L1 in the power transmission section 10. At the time, when the electronic devices 21 are 22 each serving as a feeding object (charge object) are placed on (or brought near) a top surface (power transmission surface) of the charging tray 1, the coil L1 in the charging tray 1 and the coils L21 and L22 in the electronic devices 21 are 22 are close to each other near the top surface of the charging tray 1.

In this way, when the coils L21 and L22 are placed near the coil L1 producing the magnetic field (magnetic flux), an electromotive force is induced in each of the coils L21 and L22 by the magnetic flux produced from the coil L1. In other words, by electromagnetic induction or magnetic resonance, a magnetic field is produced through interlinkage between the coil L1 and each of the coils L21 and L22 and as a result, electric power transmission from the coil L1 side (the charging tray 1 side, or the power transmission section 10 side) to the coils L21 and L22 side (the electronic devices 21 and 22 side, or the power receiving sections 210 and 220 side) is performed.

Then, in the electronic device 21, when the AC power received by the coil L21 is supplied to the charging section 211 via the switch SW21, the charging operation is performed. In other words, after this AC power is converted into predetermined DC power by the rectifier circuit 211A, the battery 212 is charged by the charging circuit 211B based on this DC power. In this way, in the electronic device 21, the charging operation is performed based on the electric power received by the power receiving section 210. Similarly, in the electronic device 22, when the AC power received by the coil L22 is supplied to the charging section 221 via the switch SW22, the charging operation is performed. In other words, after this AC power is converted into predetermined DC power by the rectifier circuit 221A, the battery 222 is charged by the charging circuit 221B based on this DC power. In this way, in the electronic device 22, the charging operation is performed based on the electric power received by the power receiving section 220.

In other words, in the present embodiment, at the time of charging the electronic devices 21 and 22, for example, terminal connection to an AC adapter or the like may be eliminated, and it is possible to easily start the charge (perform the noncontact feeding) by merely placing the electronic devices 21 and 22 on (bringing the electronic devices 21 and 22 closer to) the top surface of the charging tray 1. This reduces a burden on a user.

[2. Charging Operation for Electronic Devices]

Next, the charging operation (selective charging operation by the time sharing control) for the two or more electronic devices, which is one of characteristics of the embodiment according to the present disclosure, will be described in detail by making a comparison with a comparative example.

2-1. Comparative Example

Figure 2:
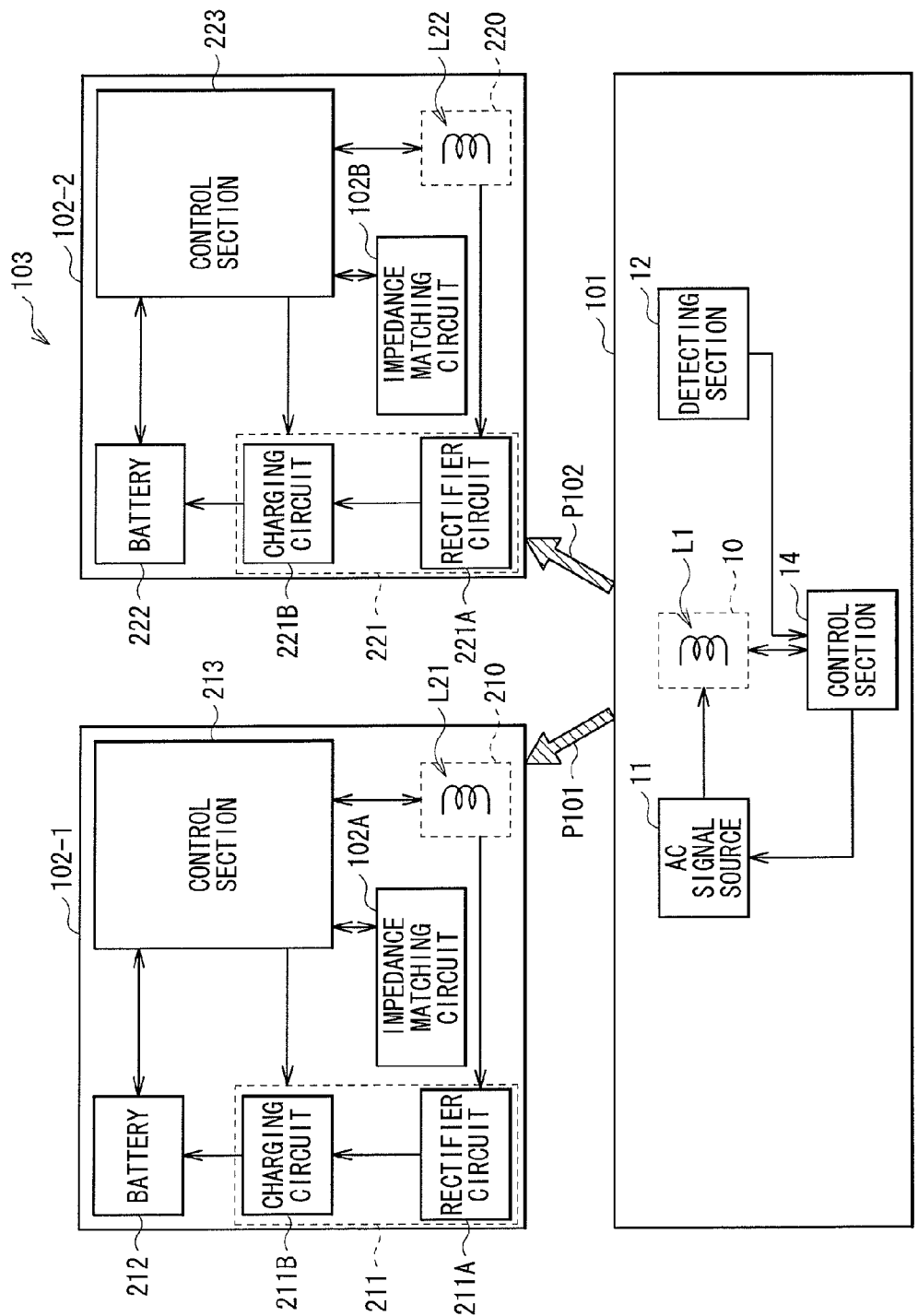
FIG. 2 is a block diagram illustrating an overall configuration of a feed system according to a comparative example.

FIG. 2 illustrates an overall block configuration of a feed system (feed system 103) according to the comparative example. The feed system 103 of this comparative example performs noncontact electric power transmission by using a magnetic field like the feed system 3 of the present embodiment, and includes a charging tray (feed apparatus) 101 and two or more (here, two) electronic devices 102-1 and 102-2.

The charging tray 101 is configured not to have (omit) the impedance matching circuit 13 and the system control section 30 in the charging tray 1 of the present embodiment.

The electronic device 102-1 is configured not to have (omit) the switch SW21 in the electronic device 21 of the present embodiment, while further having an impedance matching circuit 102A. Similarly, the electronic device 102-2 is configured not to have (omit) the switch SW22 in the electronic device 22 of the present embodiment, while further having an impedance matching circuit 102B.

The impedance matching circuits 102A and 102B are circuits which carry out impedance matching when performing the electric power transmission from the charging tray 101 to the electronic devices 102-1 and 102-2. Specifically, here, the impedance (for example, the impedances of coils L21 and L22) in the power receiving sections 210 and 220 are changed depending on the magnitude of the impedance (for example, the impedance of a coil L1) in a power transmission section 10.

In the feed system 103 of this comparative example, at the time of performing noncontact charging operation by using the magnetic field for the two electronic devices 102-1 and 102-2, the charging operation is performed for these electronic devices 102-1 and 102-2 at the same time (in parallel), unlike the charging operation of the present embodiment to be described later. In other words, as indicated by arrows P101 and P102 in FIG. 2, the charging operation is performed by the single charging tray 101 for the two electronic devices 102-1 and 102-2 simultaneously ("1:N" (here, N=2) charge is performed). However, in this comparative example, such "1:N" charging operation results in the following disadvantage.

[Complexity of Circuit Configuration in Impedance Matching Circuit Etc.]

Specifically, a first disadvantage is as follows. When an attempt is made to perform efficient power supply (charge) for the two electronic devices 102-1 and 102-2 simultaneously placed on the charging tray 101, the circuit configuration of the impedance matching circuit and the like provided in the charging tray or the electronic device becomes complicated. In other words, in the example illustrated in FIG. 2, the circuit configurations of the impedance matching circuits 102A and 102B in the electronic devices 102-1 and 102-2 become complicated.

Specifically, in particular, in a case of noncontact power supply using magnetic resonance, a pinpoint impedance matching circuit is desired in order to enhance electric-power transmission efficiency, but first of all, the difference in control range between the case of "1:1" charge and the case of "1:N" charge increases.

Figures 3A, 3B, 3C:
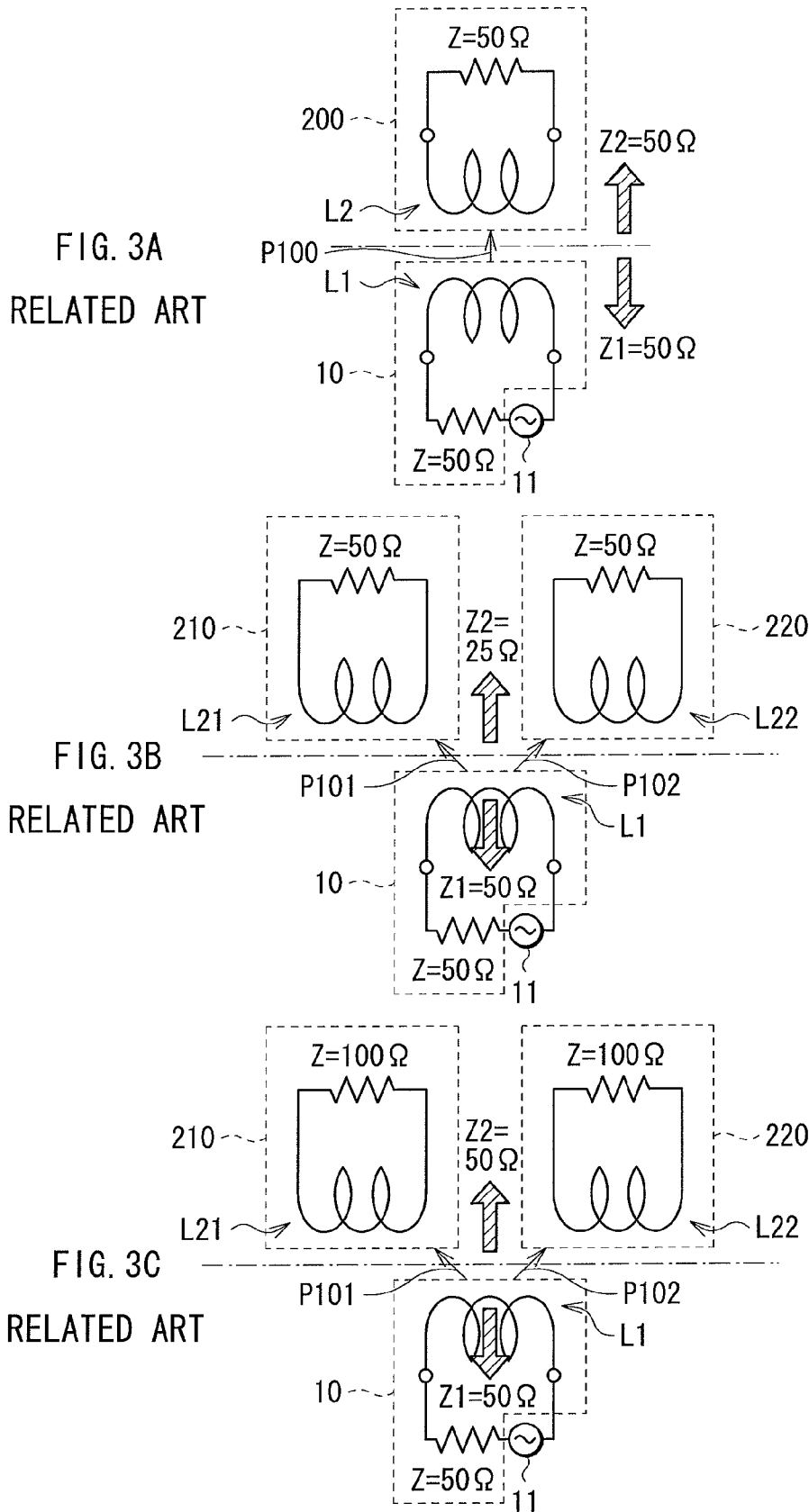
FIGS. 3A to 3C are circuit diagrams for explaining impedance matching in the feed system according to the comparative example.

For example, as illustrated in FIG. 3A, in the case of "1:1" charge from the power transmission section 10 (the coil L1) in the single charging tray 101 to a power receiving section 200 (a coil L2) in a single electronic device (see an arrow P100 in FIG. 3A), electric-power transmission efficiency is improved by setting the respective impedances as the same value. Specifically, in this example, by setting an impedance Z in each of the power transmission section 10 and the power receiving section 200 to 50Ω, each of an impedance Z1 on a primary side (the charging tray 1 side) and an impedance Z2 on a secondary side (the electronic device side) is set to 50Ω.

On the other hand, in the case of the above-mentioned "1:N" charge, as illustrated in FIG. 3B, for example, when an impedance Z in each of the power transmission section 10 and the power receiving sections 210 and 220 is set to 50Ω, an impedance mismatch occurs. In other words, in this example, the two electronic devices 102-1 and 102-2 operate concurrently and thus, the impedance Z2 on the secondary side equals (50/2)=25Ω (≠the impedance Z1 on the primary side), lowering the electric-power transmission efficiency. Therefore, in this example, as illustrated in FIG. 3C, for instance, the impedance matching circuits 102A and 102B in the electronic devices 102-1 and 102-2 set the respective impedances Z in the power receiving sections 210 and 220 to 100Ω. As a result, the impedance Z2 on the secondary side equals 50Ω (=the impedance Z1 on the primary side), and thereby matching of impedance is achieved, which improves the electric-power transmission efficiency.

Here, when an attempt is made to perform such impedance matching, the circuit configuration of each of the impedance matching circuits 102A and 102B becomes complicated. Further, the impedance of each of the electronic devices 102-1 and 102-2 changes depending on the state of charging the batteries 212 and 222 built therein. Therefore, in the case of "1:N" charge, when an attempt is made to perform appropriate impedance matching for all the electronic devices, difficult control is desired because the charging states of the electronic devices are usually different from each other. This also makes the circuit configuration of each of the impedance matching circuits 102A and 102B complicated. It is to be noted that although illustration is not provided, even when such an impedance matching circuit is provided on the charging tray 1 side (primary side), the circuit configuration becomes complicated likewise.

[Decline in Electric Power Transmission Efficiency Due to Mutual Induction Etc.)

Figure 4:
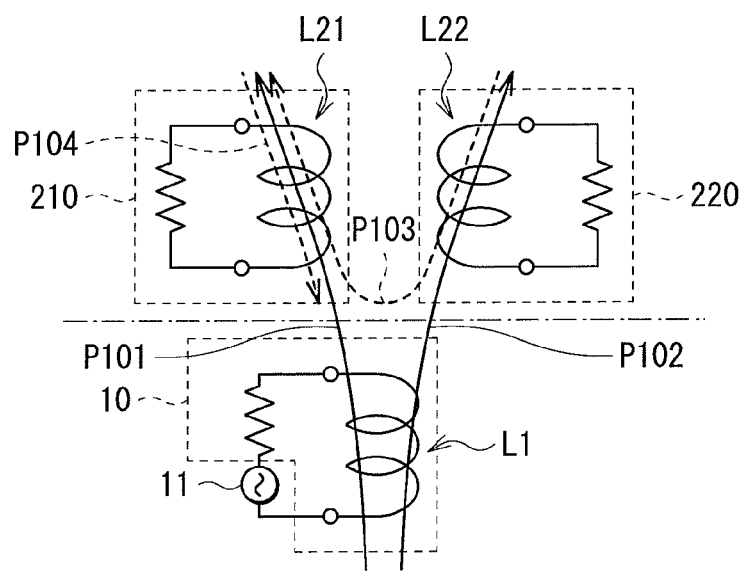
FIG. 4 is a circuit diagram for explaining mutual induction between electronic devices in the feed system according to the comparative example.

Further, as a second disadvantage, there is a decline in the electric-power transmission efficiency due to mutual induction. In other words, at the time of "1:N" charge according to the comparative example described above, basically, the electric power from the charging tray 101 side is divided into N and supplied to the respective electronic devices. In this case however, the electronic devices have some little influence on each other due to mutual induction and the like and thus, mutually disturb receipt of the electric power, leading to a drop in the electric-power transmission efficiency (see, for example, an arrow P103 in FIG. 4). Specifically, in addition to the electric power transmission using the magnetic field indicated by arrows P101 and P102 in FIG. 4, an electromotive force indicated by an arrow P104 in FIG. 4 and the mutual induction indicated by the arrow P103 in FIG. 4 are produced.

In this way, in the charging operation of this comparative example, the circuit configuration of the impedance matching circuit and the like becomes complicated, and the electric-power transmission efficiency declines due to the mutual induction. As a result, there is a possibility that when the electric power transmission using the magnetic field is performed for the two or more electronic devices, it will be difficult to efficiently supply the electric power by a simple structure, increasing the charging time to a great extent.

2-2. Charging Operation in Present Embodiment

In contrast, in the present embodiment, when the electric power transmission using the magnetic field (utilizing the electromagnetic induction, magnetic resonance, or the like) from the charging tray 1 (the power transmission section 10) to the two electronic devices 21 and 22 (the power receiving sections 210 and 220) is performed, the predetermined time sharing control is carried out by the system control section 30. Specifically, at the time, the system control section 30 performs the time sharing control (control through a time sharing system) for switching whether or not to carry out the charging operation based on the electric power transmitted to the power receiving sections 210 and 220 in the electronic devices 21 and 22. In other words, unlike the comparative example described above in which the charging operation is performed for the electronic devices 102-1 and 102-2 simultaneously (in parallel), the control sections 213 and 223 in the electronic devices 21 and 22 are under the time sharing control, so that the charging operation is carried out selectively (in turn) by the time sharing in the electronic devices 21 and 22. This charging operation in the present embodiment will be described below in detail.

Figure 5:
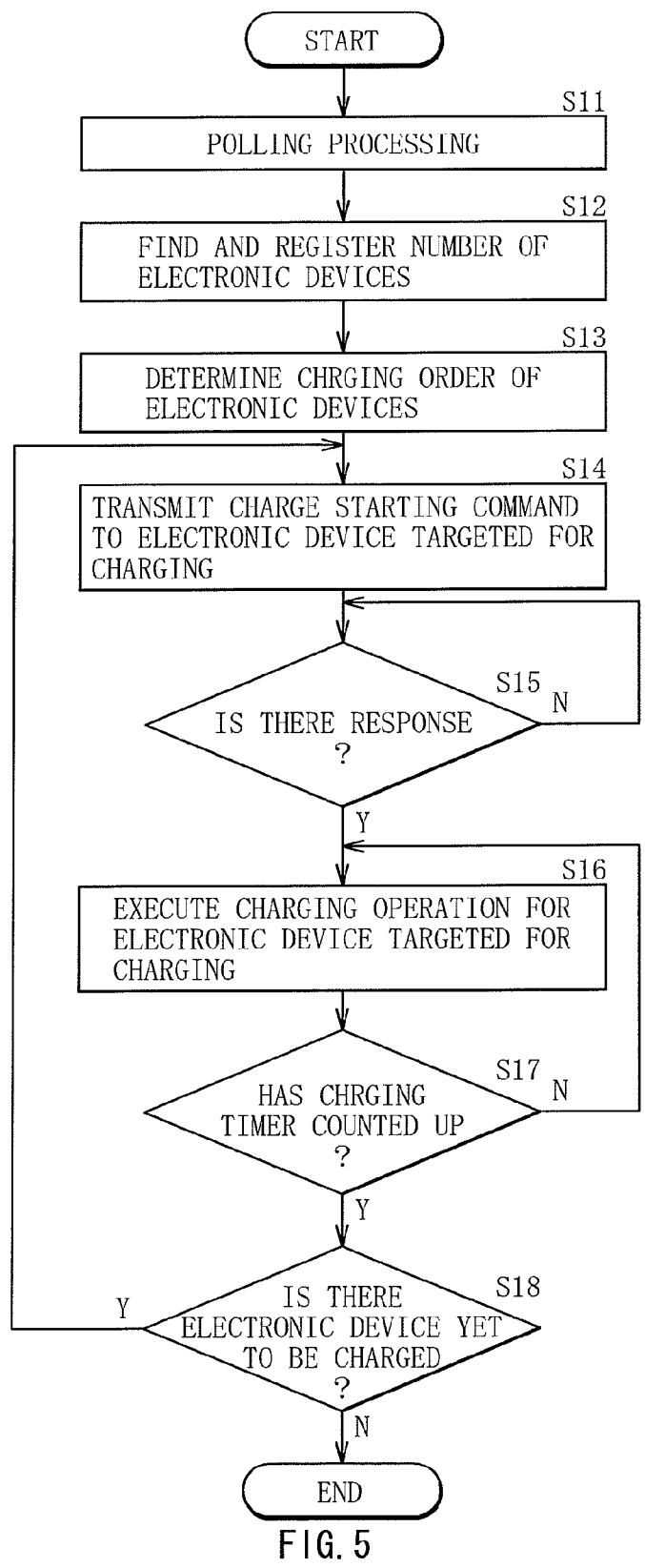
FIG. 5 is a flowchart illustrating an example of system control at the time of charging operation according to the embodiment.

FIG. 5 illustrates an example of system control (system control by the system control section 30) in the charging operation of the present embodiment, in a flowchart.

[Determination of Charging Order Using Polling Processing]

First, the system control section 30 determines the charging order using the Polling processing to be described below, for the charging tray 1 and the electronic devices 21 and 22 (the control sections 14, 213, and 223), while taking an anti-collision measure. This anti-collision measure refers to a measure to prevent the occurrence of a processing collision between the electronic devices 21 and 22 (here, to prevent the turns for charging from becoming the same).

Specifically, at first, the system control section 30 controls the control sections 14, 213, and 223 to perform predetermined Polling processing between the charging tray 1 and the electronic devices 21 and 22 (step S11), thereby finding and registering the number of (here, two) of the electronic devices targeted for charging (step S12). As specifically illustrated in FIG. 6, for example, this Polling processing is carried out by transmitting a Polling signal (inquiry signal) P from the charging tray 1 side to the electronic devices 21 and 22 side, and transmitting response signals (reply signals) R1 and R2 from the electronic devices 21 and 22 side to the charging tray 1 side. In this way, the system control section 30 constantly checks fluctuations in the number of electronic devices targeted for charging.

Subsequently, through the use of such Polling processing, the system control section 30 determines the charging order for the electronic devices 21 and 22, while taking the above-described anti-collision measure (step S13). Specifically, as illustrated in, for example, Parts (A) to (C) of FIG. 7, the numbers of predetermined time-slots specifying the turns in the charging order are prevented from matching with each other, in the response signals R1 and R2 to the Polling signal (here, there are five slots (1) to (5)). In other words, as in the example illustrated in Parts (A) to (C) of FIG. 7, when the number of the time-slot (number: "2") of the response signal R1 from the electronic device 21 and the number of the time-slot (number: "5") of the response signal R2 from the electronic device 22 do not match with each other, the turns for charging are determined. It is to be noted that in contrast, as illustrated in Parts (A) to (C) of FIG. 8, for example, when the numbers of the time-slots of these response signals R1 and R2 agree with each other (in this example, the numbers are both "2"), the turns for charging are not determined.

[Selective Charging Operation by Time Sharing]

Subsequently, the system control section 30 controls the control sections 213 and 223 of the electronic device 21 and 22 by the time sharing, so that the charging operation is carried out in the electronic devices 21 and 22 selectively by the time sharing.

Specifically, first, the system control section 30 controls the control section 14 so that a predetermined charge starting command is transmitted to the electronic device targeted for charging (step S14). Subsequently, the system control section 30 checks whether a predetermined response (a response signal to the charge starting command) is sent from this electronic device targeted for charging (step S15). In other words, when there is no response (step S15: N), processing in this step S15 is repeated until a response is obtained (until step S15: Y is achieved).

Subsequently, when there is a response from the electronic device targeted for charging (step S15: Y), the system control section 30 then causes execution of the charging operation for the electronic device targeted for charging (step S16). Specifically, the system control section 30 switches whether or not to carry out the charging operation in each of the electronic devices 21 and 22, by controlling on-off operation of the switches SW21 and SW22 in the electronic devices 21 and 22, via the control sections 14, 213, and 223.

Specifically, for example, as indicated by an arrow P11 in FIG. 9, during a selective charging period T1 for the charge from the charging tray 1 to the electronic device 21, the system control section 30 controls the switching of the on-off operation of the switches SW21 and SW22 by the control sections 213 and 223 in the following manner. During this charging period T1, the switching control is performed so that the switch SW21 in the electronic device 21 is ON while the switch SW22 in the electronic device 22 is OFF. As a result, as indicated by in an arrow P21 in FIG. 9, in the electronic device 21, the electric power received by the power receiving section 210 is supplied to the charging section 211 and thereby the charging operation for the battery 212 is performed. On the other hand, in the electronic device 22, the electric power is not supplied to the charging section 221 and thus, the charging operation for the battery 222 is not performed. It is to be noted that at the time, the electronic device 22 waits for its turn for its charging period, while receiving only a small amount of electric power that is minimum (electric power desirable for performing the Polling processing with the charging tray 1 side).

At the time, the system control section 30 constantly checks whether the charging timer 30A has counted up (here, whether the length of the charging period T1 set beforehand is reached) (step S17). Specifically, when this charging timer 30A has not counted up (step S17: N), the flow returns to step S16 to continue the charging operation, and when the charging timer 30A has counted up (step S17: Y), the flow proceeds to the next processing. In this next processing, the system control section 30 checks whether there is an electronic device for which the charging operation is yet to be performed (step S18). Here, since there is an electronic device for which the charging operation is yet to be performed (the electronic device 22), the processing in steps S14 to S17 described above is performed subsequently again.

In other words, for example, as indicated by an arrow P12 in FIG. 10, a selective charging period T2 for the charge from the charging tray 1 to the electronic device 22 begins, and the system control section 30 controls the switching of the on-off operation of the switches SW21 and SW22 by the control sections 213 and 223, in the following manner. During this charging period T2, the switching control is performed so that the switch SW21 in the electronic device 21 is OFF while the switch SW22 in the electronic device 22 is ON. As a result, as indicated by an arrow P22 in FIG. 10, in the electronic device 22, the electric power received by the power receiving section 220 is supplied to the charging section 221, and thereby the charging operation for the battery 222 is performed. On the other hand, in the electronic device 21, the charging operation for the battery 212 is not performed because the electric power is not supplied to the charging section 211. It is to be noted that the electronic device 21 receives only a small amount of electric power that is minimum (electric power desirable for performing the Polling processing with the charging tray 1 side).

It is to be noted that in this example, in the next step S18, it is determined that there is no electronic device yet to be charged (step S18: N), and the overall processing illustrated in FIG. 5 ends.

In this way, in the charging operation of the present embodiment, when the electric power transmission using the magnetic field from the charging tray 1 to the electronic devices 21 and 22 is carried out, the system control section 30 performs the time sharing control for switching whether or not to carry out the charging operation based on the electric power transmitted from the power transmission section 10 to the power receiving sections 210 and 220. This realizes effective electric power transmission to the electronic devices 21 and 22, without using a complicated circuit (for example, an impedance matching circuit or the like). Specifically, because the "1:1" charging operation is performed during each charging operation, the circuit configuration of the impedance matching circuit (here, the impedance matching circuit 13) is simple, as compared to a case using the "1:N" charging operation like the comparative example described above. In other words, instead of using a complicated impedance matching circuit for the "1:N" charging operation, a simple impedance matching circuit on the scale of that for the "1:1" charging operation may be employed. In addition, the charging operation of the present embodiment is the time sharing control between the electronic devices 21 and 22 and thus, mutual induction or the like between the electronic devices 21 and 22 produced in the charging operation of the comparative example described above is avoided, and thus the efficiency of the electric power transmission improves in this regard as well.

As described above, in the present embodiment, when the electric power transmission using the magnetic field from the charging tray 1 to the electronic devices 21 and 22 is performed, the system control section 30 performs the time sharing control for switching whether or not to carry out the charging operation based on the electric power transmitted from the power transmission section 10 to the power receiving sections 210 and 220. Therefore, it is possible to avoid using a complicated circuit and causing the mutual induction or the like, thereby realizing efficient electric power transmission to the electronic devices 21 and 22. Accordingly, when the electric power transmission using the magnetic field is performed for the electronic devices 21 and 22, the electric power may be supplied efficiently by a simple structure.

(Modifications)

Subsequently, modifications (modifications 1 to 3) of the embodiment will be described. It is to be noted that the same elements as those of the embodiment will be provided with the same reference characters as those of the embodiment, and the description will be omitted as appropriate.

[Modification 1]

FIG. 11 and FIG. 12 each illustrate an overall block configuration and charging operation of a feed system (feed system 3A) according to the modification 1. The feed system 3A of the present modification includes a charging tray 1 and two or more (here, two) electronic devices 21A and 22A. In other words, the feed system 3A is equivalent to the feed system 3 of the embodiment described above, except that the electronic devices 21A and 22A are provided in place of the electronic devices 21 and 22.

The electronic devices 21A and 22A are configured like the electronic devices 21 and 22 in the embodiment described above, except that the switches SW1 and SW2 are not provided (omitted). In addition, in these electronic devices 21A and 22A, control sections 213 and 223 supply charging sections 211 and 221 with disable signals D21 and D22 each of which is a control signal for switching whether or not to carry out the charging operation. As a result, in the present modification, a system control section 30 is allowed to switch whether or not to carry out the charging operation in the electronic devices 21 and 22, as well.

Specifically, for example, during a charging period T1 illustrated in FIG. 11, the system control section 30 controls operation of generating and outputting the disable signals D21 and D22 by the control sections 213 and 223, in the following manner. That is, during this charging period T1, the control is performed so that the disable signal D21 in the electronic device 21A becomes invalid (the charging operation of the charging section 211 is performed) and the disable signal D22 in the electronic device 22A becomes valid (the charging operation of the charging section 221 is not performed). As a result, in the electronic device 21A, the charging operation based on the electric power (see an arrow P21) received by a power receiving section 210 is carried out by the charging section 211, and the charging operation for a battery 212 is performed. On the other hand, in the electronic device 22A, the charging operation based on the electric power (see an arrow P22) received by the power receiving section 220 is not performed by the charging section 221, and thereby the charging operation for a battery 212 is not performed.

On the other hand, during a charging period T2 illustrated in FIG. 12, for example, the system control section 30 controls the operation of generating and outputting the disable signals D21 and D22 by the control sections 213 and 223, in the following manner. During this charging period T2, the control is performed so that the disable signal D21 in the electronic device 21A becomes valid (the charging operation for the charging section 211 is not performed) and the disable signal D22 in the electronic device 22A becomes invalid (the charging operation for the charging section 221 is performed). As a result, in the electronic device 21A, the charging operation based on the electric power received by the power receiving section 210 is not performed by the charging section 211, and thereby the charging operation for the battery 212 is not performed. On the other hand, in the electronic device 22A, the charging operation based on the electric power received by the power receiving section 220 is performed by the charging section 221, and thereby the charging operation for the battery 212 is performed.

In this way, in the present modification, the control sections 213 and 223 supply the charging sections 211 and 221 with the disable signals D21 and D22 each of which is the control signal for switching whether or not to carry out the charging operation and thus, it is possible to switch whether or not to carry out the charging operation in the electronic devices 21 and 22, like the above-described embodiment. Therefore, in the present modification, it is possible to obtain an effect similar to that of the embodiment described above.

[Modification 2]

FIG. 13 illustrates an overall block configuration of a feed system (feed system 3B) according to the modification 2. The feed system 3B of the present modification includes a charging tray (feed apparatus) 1B and two or more (here, two) electronic devices 21B and 22. In other words, the feed system 3B is equivalent to the feed system 3 in the embodiment described above, except that the charging tray 1B is provided in place of the charging tray 1, and the electronic device 21B is provided in place of the electronic device 21.

The charging tray 1B is configured like the charging tray 1 in the embodiment described above, except that the system control section 30 is not provided (omitted). The electronic device 21B is configured by adding the system control section 30 to the electronic device 21 in the embodiment described above. In other words, the feed system 3B of the present modification is equivalent to the feed system 3 in the embodiment described above, except that the system control section 30 is provided in one (here, the electronic device 21B) of the electronic devices (secondary side), instead of being provided in the charging tray (primary side).

In this way, the system control section 30 may be provided in one of the electronic devices instead of being provided in the charging tray, and it is possible to obtain an effect similar to that of the embodiment described above in this case as well.

It is to be noted that the present modification is configured to provide the system control section 30 in the electronic device 21B, but this system control section 30 may be provided in the electronic device 22 instead.

Further, in the present modification, in a manner similar to the modification 1 described above, whether or not to carry out the charging operation in the electronic devices 21B and 22 may be switched using disable signals D21 and D22.

[Modification 3]

FIGS. 14A and 14B each illustrate an example of charging operation according to the modification 3, in a timing chart. Specifically, in the charging operation described so far, the charging periods T1 and T2 may be equal in length within the entire charging period T as illustrated in FIG. 14A, for example. Alternatively, the charging periods T1 and T2 within the entire charging period T may vary in length for the electronic devices 21 and 22 as illustrated in FIG. 14B, for example. Specifically, in the system control section 30, a count value set in the charging timer 30A is adjusted for each of the charging periods T1 and T2 for the electronic devices 21 and 22, and thereby the lengths of such charging periods are controlled.

At the time, the system control section 30 may change the lengths of the charging periods T1 and T2, according to the level of a priority (priority of the charging operation) set in each of the electronic devices 21 and 22. Specifically, the system control section 30 may set a priority for each of the electronic devices 21 and 22, according to the frequency of execution of the charging operation in each of the electronic devices 21 and 22. In other words, for example, a high priority may be set for the electronic device with a high (or low) frequency of execution of the charging operation, while a low priority may be set for the electronic device with a low (or high) frequency of execution of the charging operation.

In this way, when the lengths of the charging periods T1 and T2 are changed according to the priority (priority of the charging operation) set for each of the electronic devices 21 and 22, it is possible to further improve the user convenience.

[Other Modifications]

Up to this point, the present technology has been described by using the embodiment and modifications, but is not limited to these embodiment and the like and may be variously modified.

For example, the embodiment and the like have been described for the case where the impedance matching circuit is provided in the charging tray 1 (primary side), but are not limited to this case, and the impedance matching circuit may be provided in the electronic device (secondary side).

Further, the embodiment has been described for the case where the anti-collision measure is taken by using the Polling processing, but the anti-collision measure may be taken by using a technique other than the Polling processing.

Furthermore, the embodiment and the like have been described for the case where the system control section 30 is provided in the charging tray (feed apparatus), or in one of the electronic devices, but are not limited to this case. In other words, such a system control section 30 may be provided in other device (system control device) separate from the charging tray and the electronic devices.

In addition, the embodiment and the like have been described above by specifically providing each element of the charging tray and the electronic device, but all elements may not be provided, or other elements may be added.

Moreover, the embodiment and the like have been described above for the case in which the two electronic devices are provided in the feed system, but the feed system according to an embodiment of the present disclosure may be applied to a case where three or more electronic devices are provided.

Further, in the embodiment and the like described above, the charging tray 1 for a small electronic device (CE device) such as a portable telephone is taken as an example of the feed apparatus according to an embodiment of the present disclosure. However, the feed apparatus according to an embodiment of the present disclosure is not limited to the charging tray 1 for home use and is applicable to use as a charger of various electronic devices. Furthermore, the tray may not be used, and, for example, a stand for an electronic device such as the so-called cradle may be used.

The present disclosure contains subject matter related to that disclosed in Japanese Priority Patent Application JP 2010-170059 filed in the Japan Patent Office on Jul. 29, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A feed system comprising: a plurality of electronic devices; and a feed apparatus having (a) a power transmission section configured to transmit electric power using a magnetic field to the plurality of electronic devices to charge the plurality of electronic devices, and (b) a system control section configured to perform a time sharing control in which charging operations of the plurality of electronic devices are executed selectively by time sharing between the plurality of electronic devices such that a charging operation of a first electronic device is executed during a first charging period and a charging operation of a second electronic device is executed during a second charging period different from the first charging period, wherein,
  (a) the system control section is further configured to change individual lengths of the first charging period and the second charging period according to a priority level set for each of the first electronic device and the second electronic device, a first priority level associated with the first electronic device being set in accordance with a frequency of execution of the charging operation of the first electronic device, and a second priority level associated with the second electronic device being set in accordance with a frequency of execution of the charging operation of the second electronic device, and
  (b) each of the plurality of electronic devices includes
  (i) a power receiving section configured to receive the electric power transmitted from the power transmission section, and
  (ii) a switching section configured to control whether or not the charging operation is carried out based on the electric power received by the power receiving section in accordance with the time sharing control of the system control section.

2. The feed system according to claim 1, wherein:
each of the plurality of electronic devices further includes (1) a charging section configured to perform the charging operation, and (2) a switch provided on a path between the power receiving section and the charging section, and
the switching section controls whether or not the charging operation is carried out by controlling an on-off operation of the switch.

3. The feed system according to claim 1, wherein:
each of the plurality of electronic devices further includes a charging section configured to perform the charging operation, and
the switching section supplies the charging section with a control signal to control whether or not the charging section performs the charging operation.

4. The feed system according to claim 1, wherein the power transmission section transmits the electric power to the power receiving section using magnetic resonance.

5. A feed system comprising: a power transmission section configured to transmit electric power using a magnetic field to a plurality of electronic devices to charge the plurality of electronic devices; and
  a system control section configured to perform a time sharing control in which charging operations of the plurality of electronic devices are executed selectively by time sharing between the plurality of electronic devices such that a charging operation of a first electronic device is executed during a first charging period and a charging operation of a second electronic device is executed during a second charging period different from the first charging period,
  wherein, the system control section is further configured to change individual lengths of the first charging period and the second charging period according to a priority level set for each of the first electronic device and the second electronic device, a first priority level associated with the first electronic device being set in accordance with a frequency of execution of the charging operation of the first electronic device, and a second priority level associated with the second electronic device being set in accordance with a frequency of execution of the charging operation of the second electronic device.

* * * * *